United States Patent [19]

Rogers

[11] Patent Number: 4,624,410
[45] Date of Patent: Nov. 25, 1986

[54] LEAD CABLE AND SPRAY HEAD FOR ARC METAL SPRAY APPARATUS

[76] Inventor: Frank S. Rogers, 4955 NW. Gustafson Rd., Silverdale, Wash. 98383

[21] Appl. No.: 694,364

[22] Filed: Jan. 24, 1985

Related U.S. Application Data

[62] Division of Ser. No. 435,022, Oct. 18, 1982, Pat. No. 4,512,513.

[51] Int. Cl.⁴ .......................... B05B 7/18; B05B 7/22; H01B 7/34
[52] U.S. Cl. ................................ 239/83; 174/15 WF; 174/47; 219/137.62; 219/137.9
[58] Field of Search ..................................... 239/79–85; 174/15 WF, 47; 219/137.44, 137.62, 137.9

[56] References Cited

U.S. PATENT DOCUMENTS 2,951,934  9/1960  Engel ..................... 219/137.44 X
3,324,225  6/1967  Thostrup ........................... 174/47
3,629,547  12/1971  Kester et al. ............. 174/15 WF X Primary Examiner—Andres Kashnikow
Attorney, Agent, or Firm—R. F. Beers; C. D. B. Curry; W. C. Daubenspeck

[57] ABSTRACT

An apparatus and method for spraying molten metal that is light weight, requires low maintenance and is quick and simple to operate. A feed system is provided that uses an electric motor and control system to push the electrodes to the head and to prevent system failure, by temporarily stopping the feed, upon the occurrence of the feed wires becoming shorted or welded together. A portable head is provided that employs parallel lead guides that allows complete head manipulation without electrode mismatch. An atomizing gas nozzle is also provided that permits lower air pressure and compensates for arc wander. A lead system is provided that combines into one lead the feed wire guides, current leads and the atomizing gas. The atomizing gas also becomes a cooland allowing lighter current leads for arc metal spraying.

30 Claims, 32 Drawing Figures

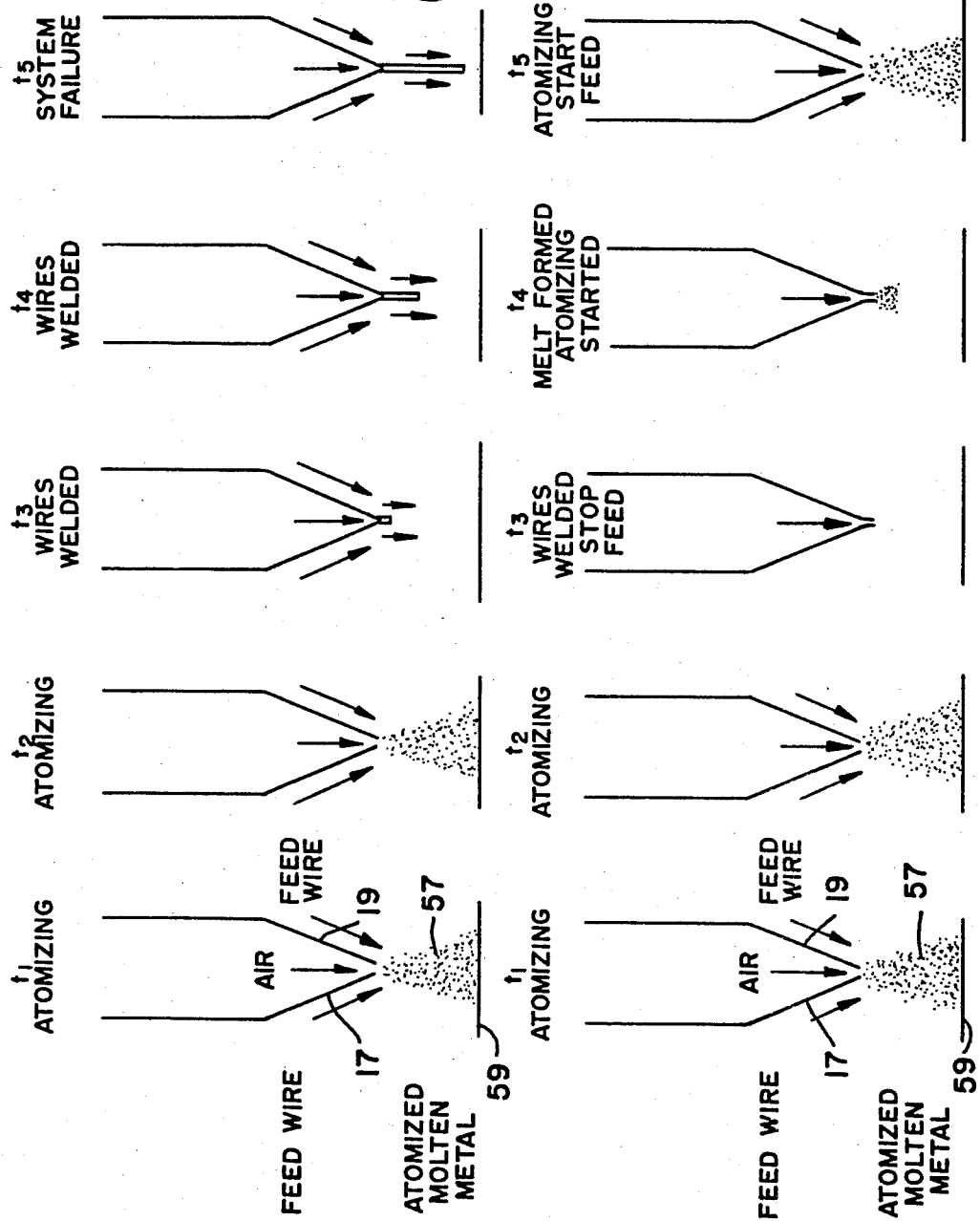

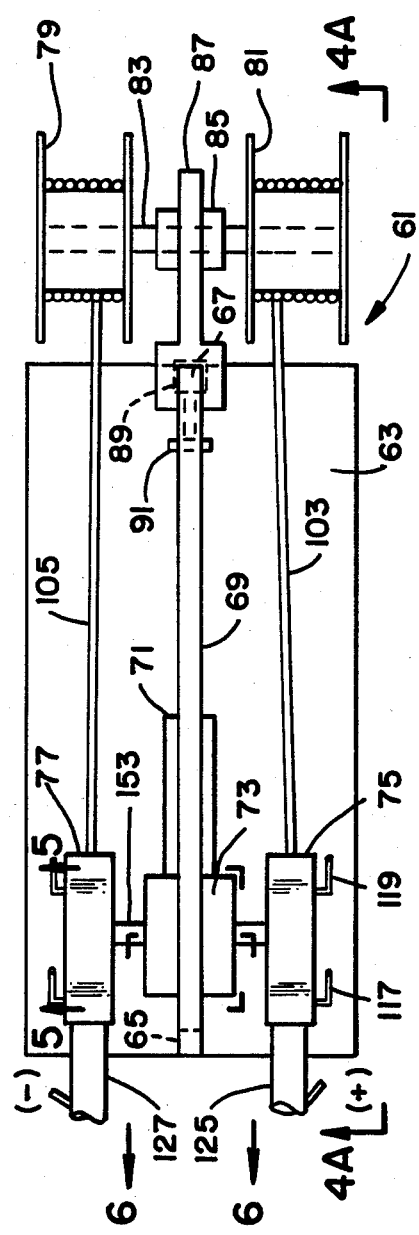

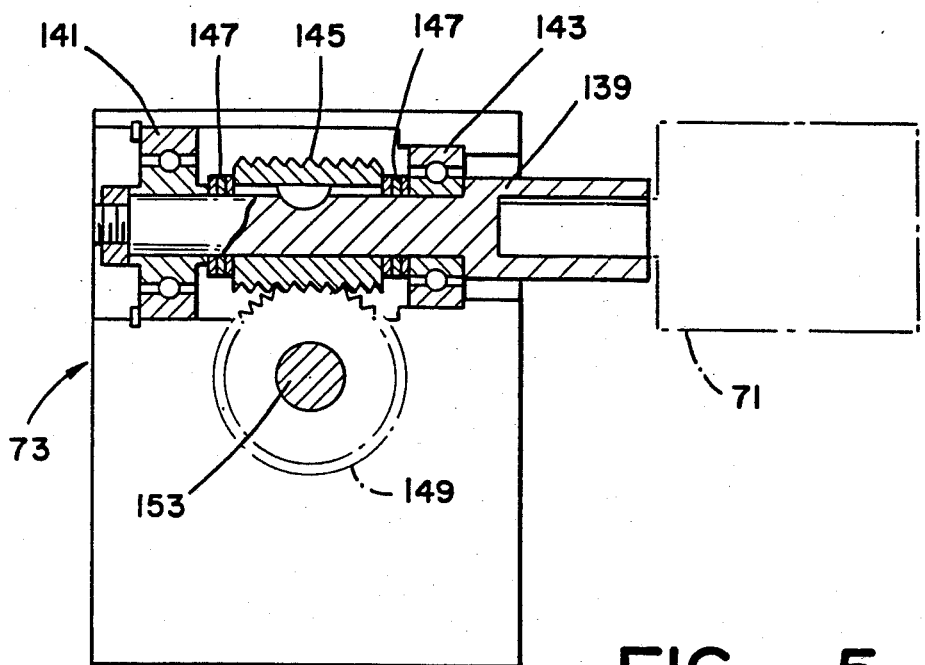
FIG_5
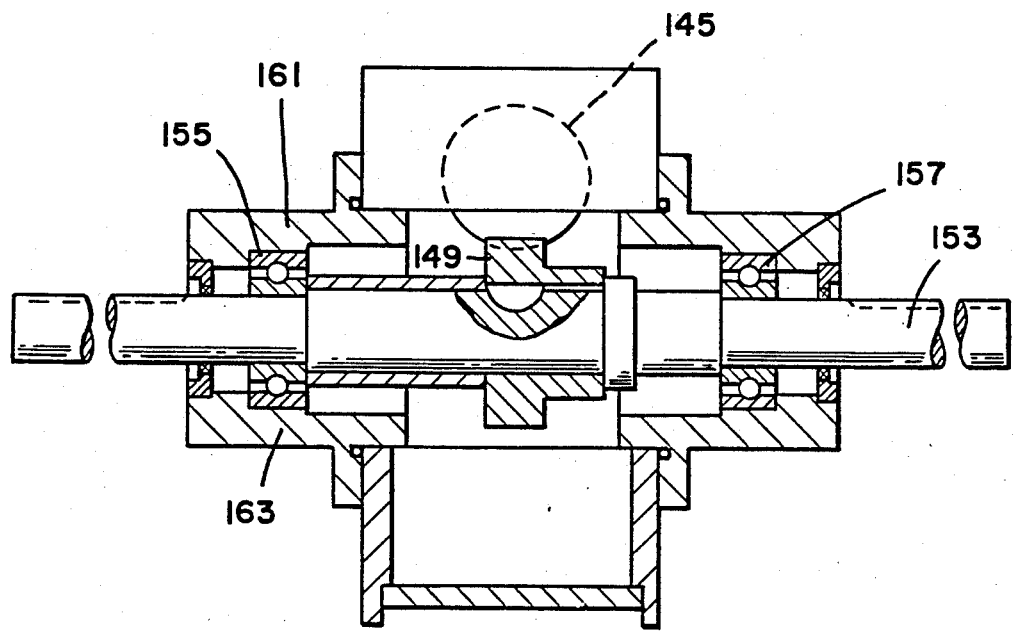
FIG_6

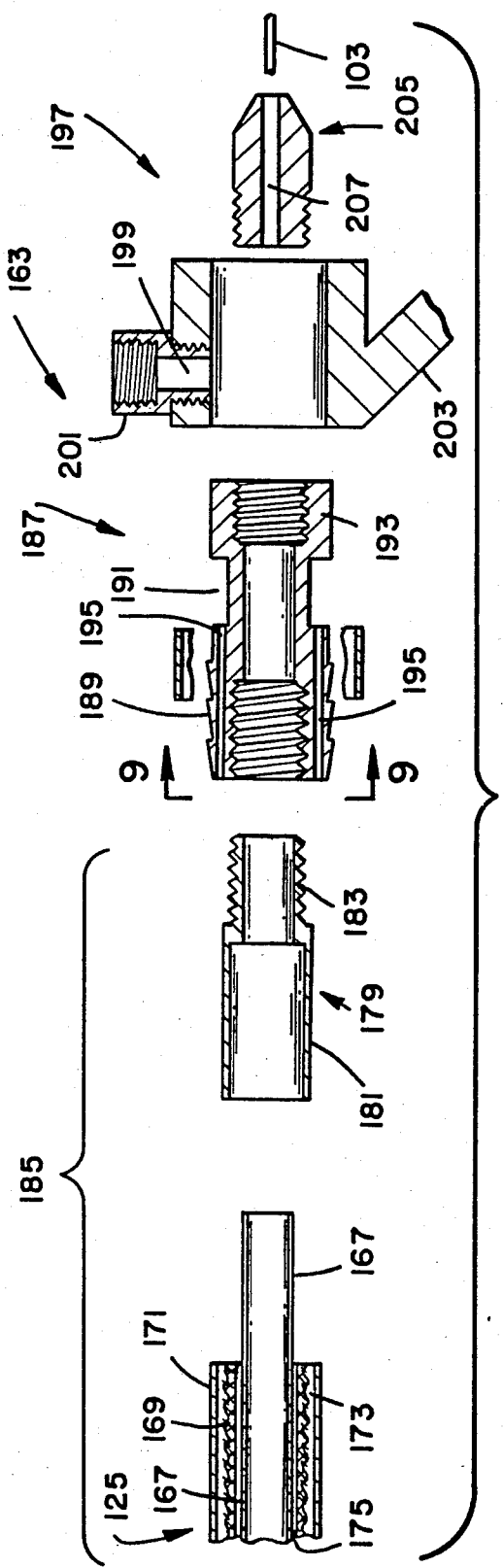
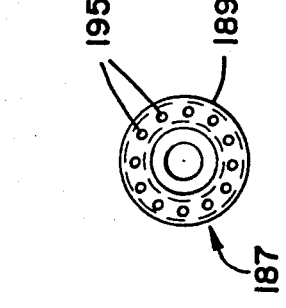
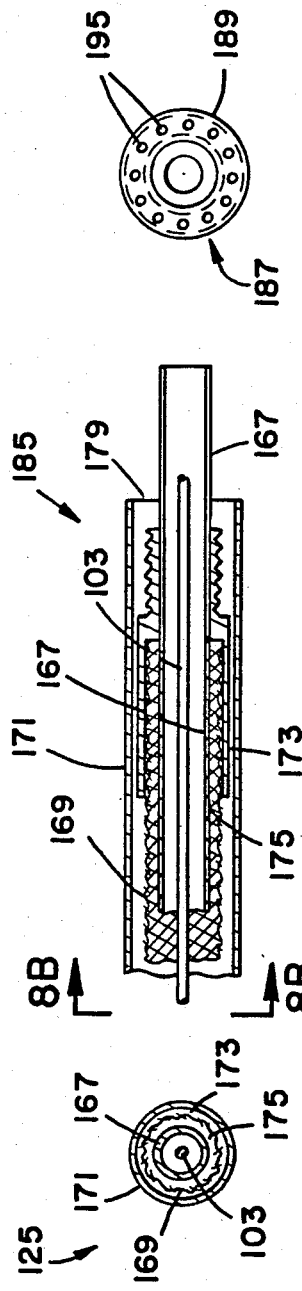

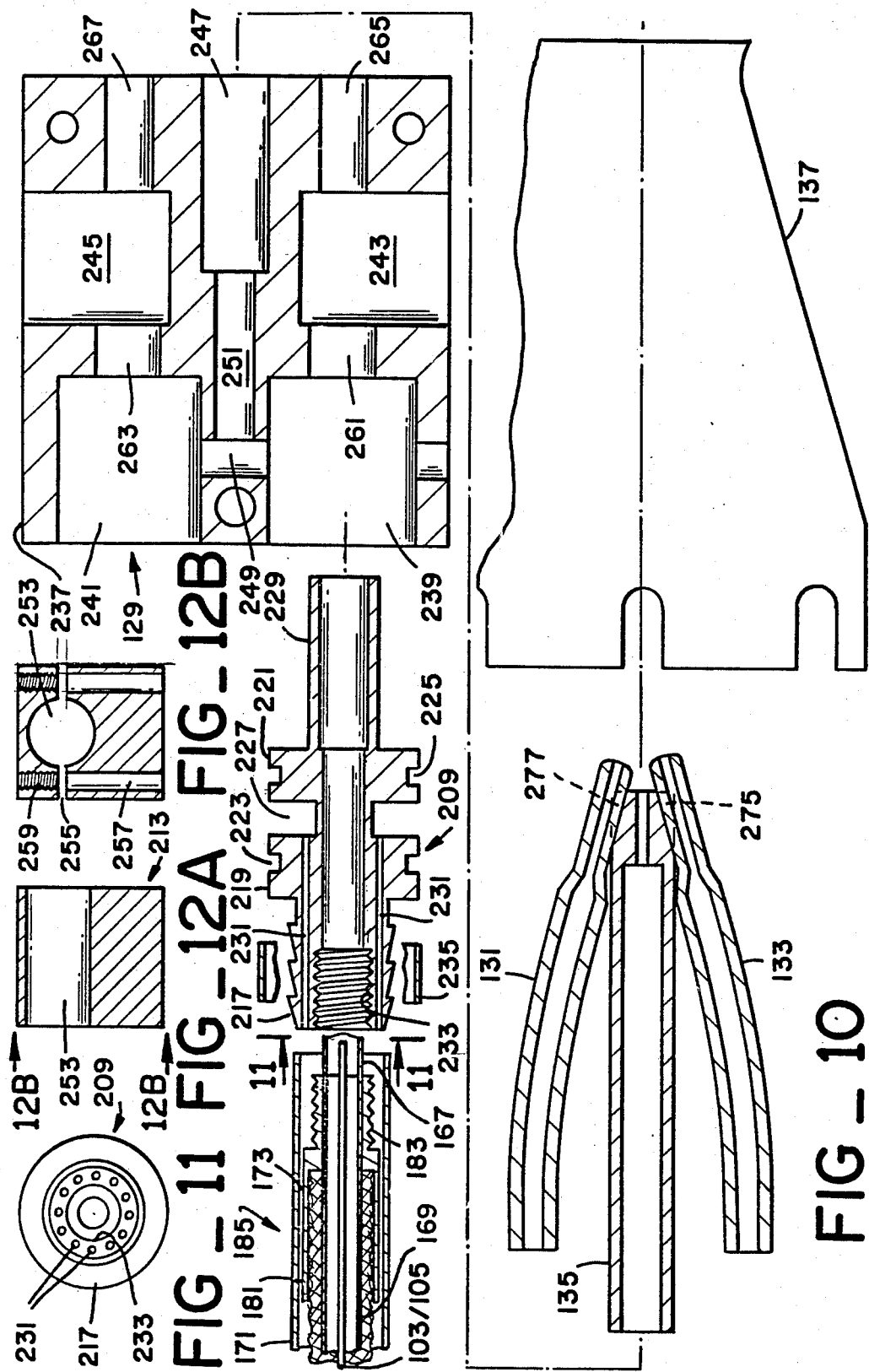

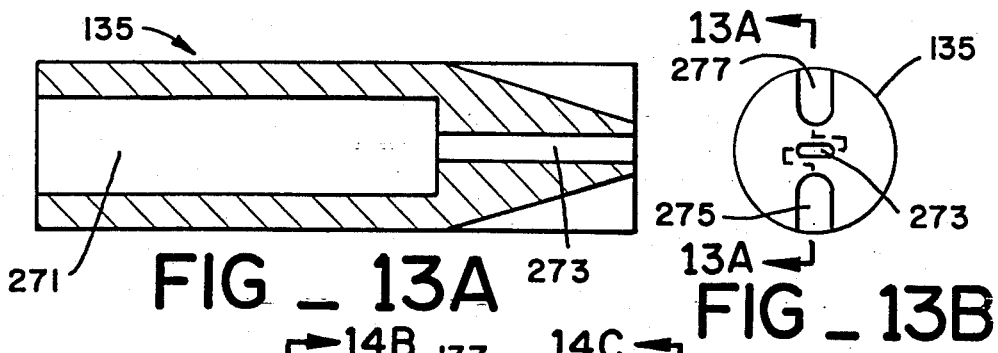
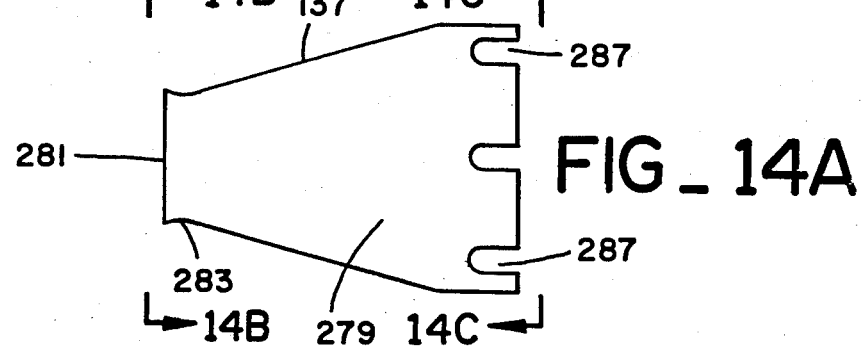
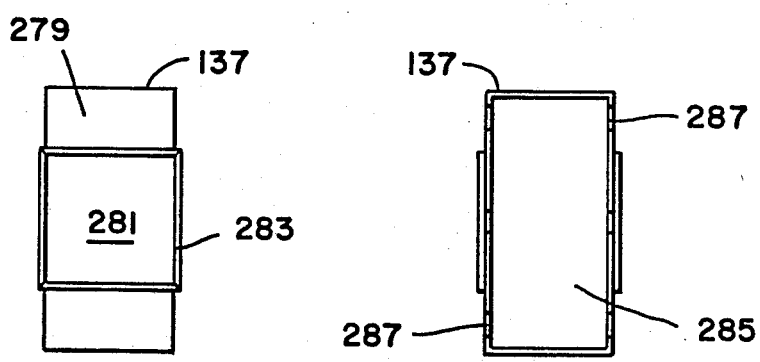
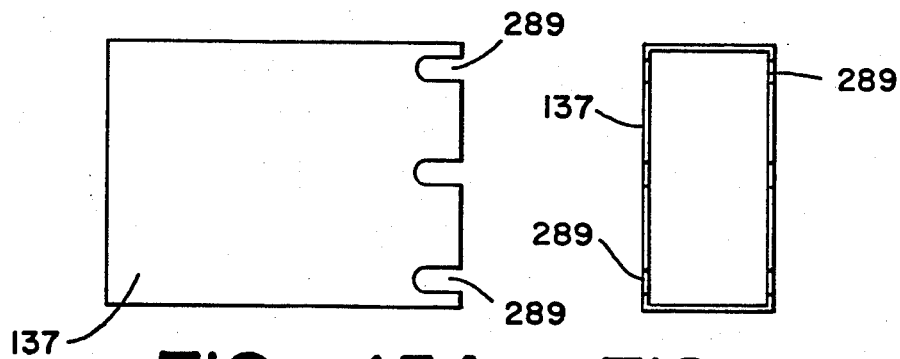

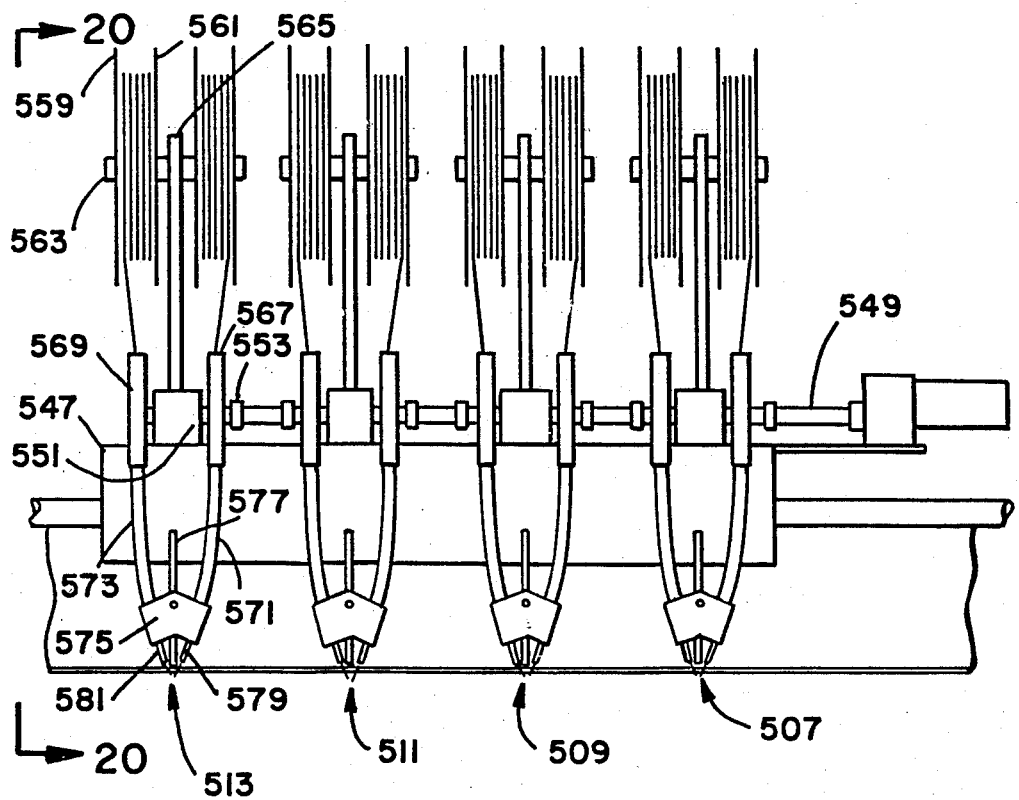
FIG _ 19
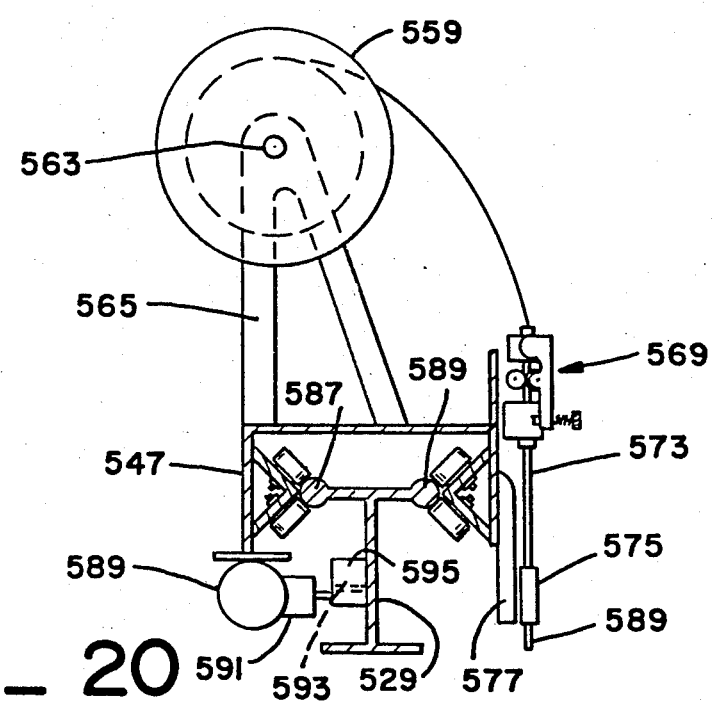
FIG _ 20

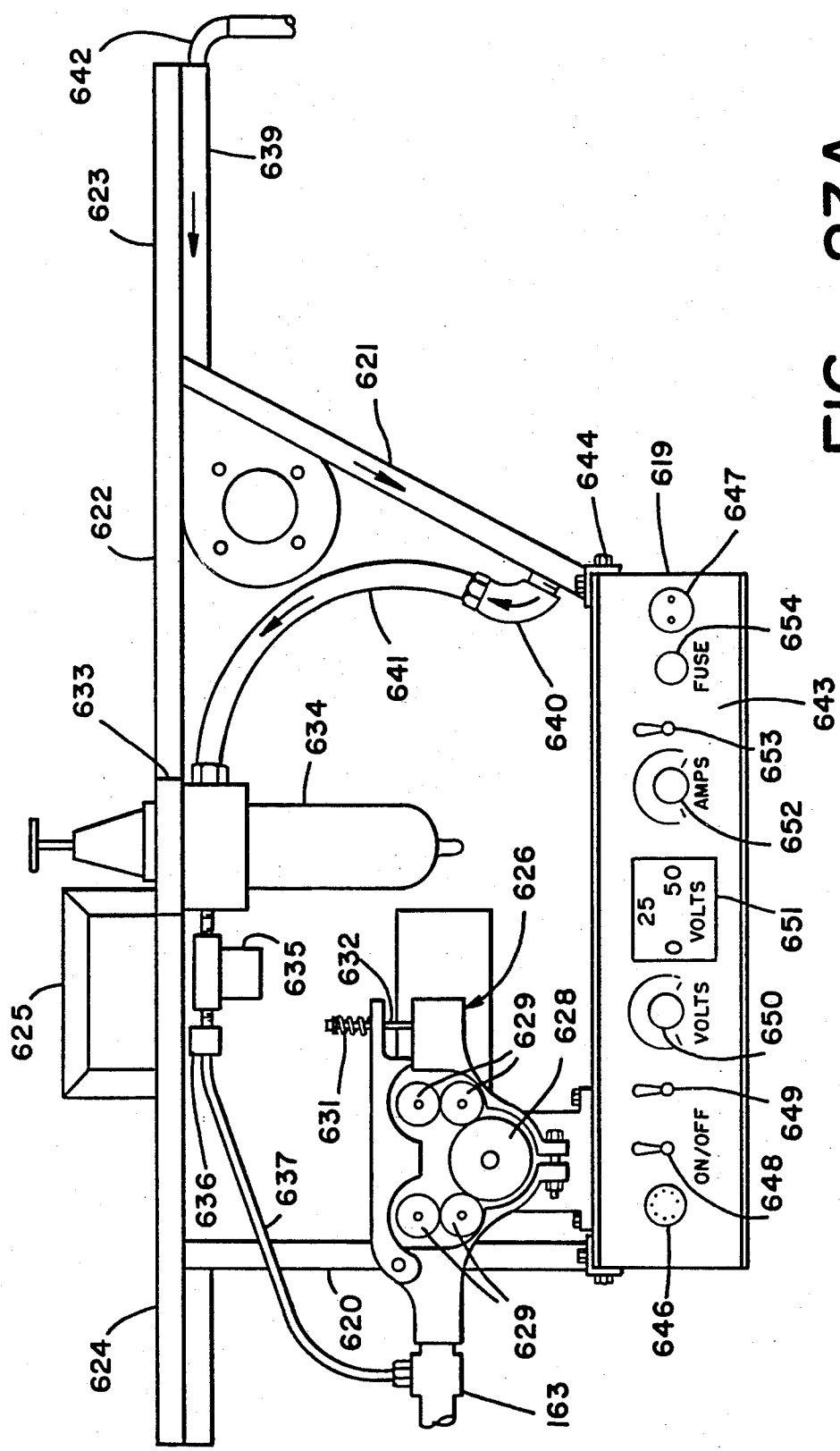

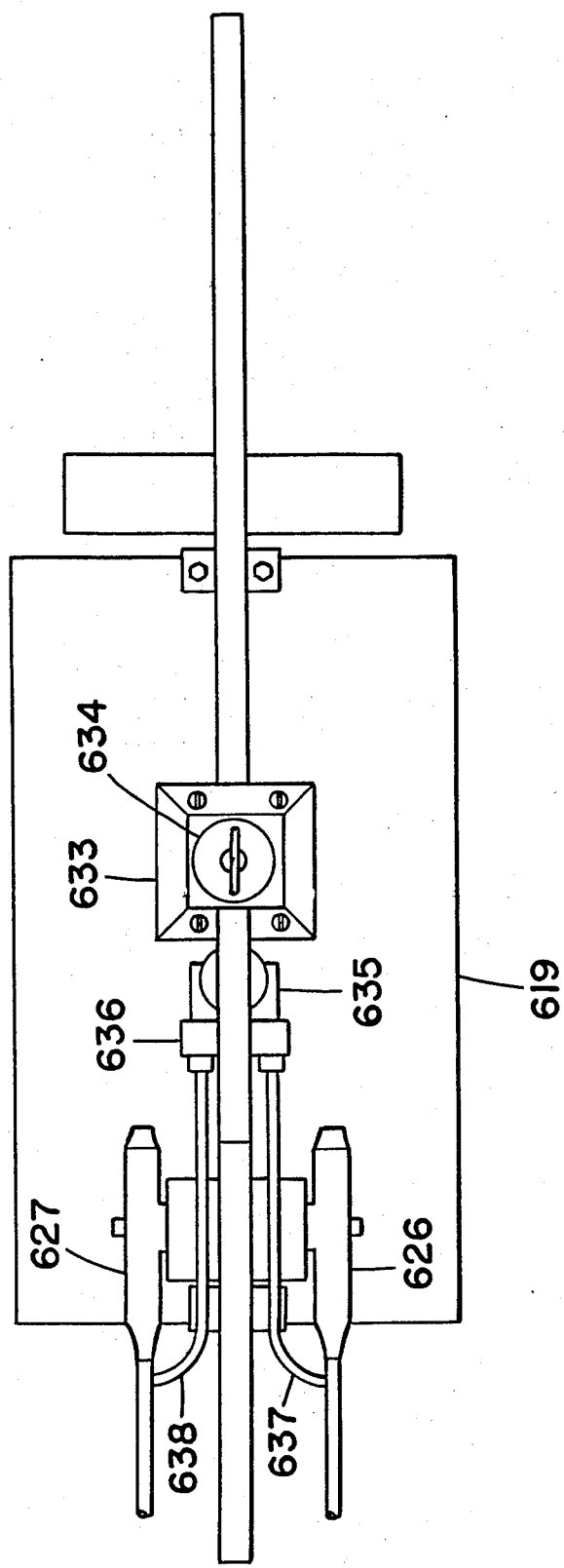
FIG_23B

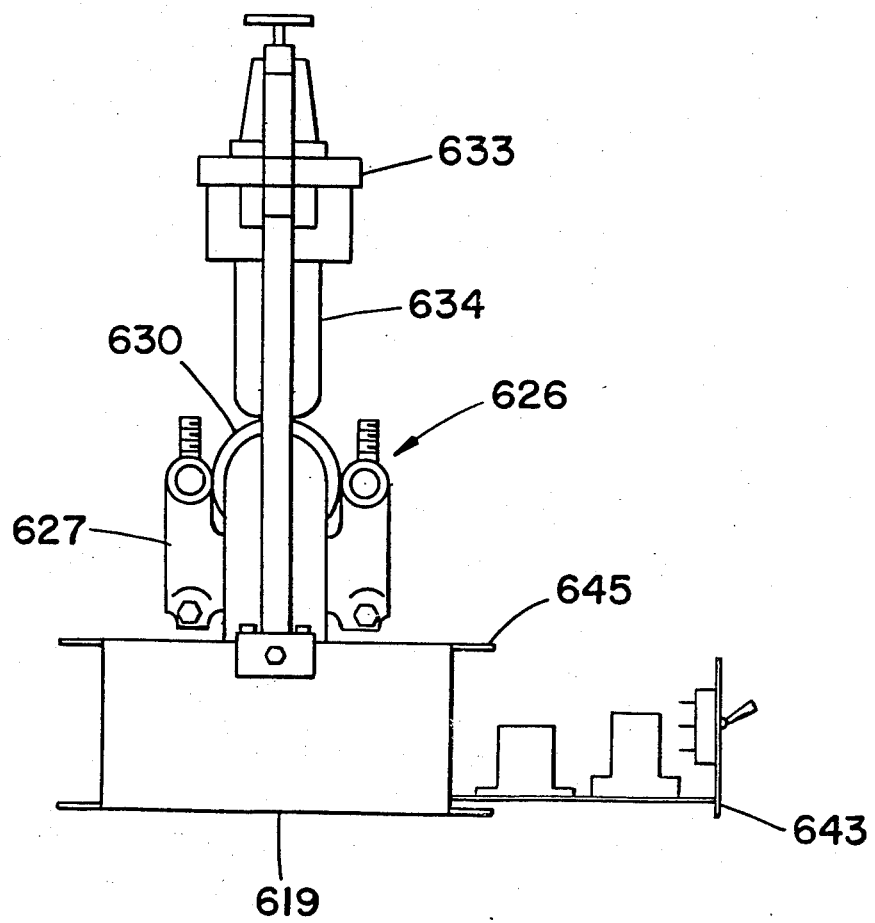
FIG_23C

LEAD CABLE AND SPRAY HEAD FOR ARC METAL SPRAY APPARATUS

This application is a division, of application Ser. No. 435,022, filed Oct. 18, 1982, now U.S. Pat. No. 4,512,513.

BACKGROUND OF THE INVENTION

1. Field of the Invention

The present invention relates to arc spray systems and more particularly to arc spray systems apparatus and methods for spraying molten metal.

2. Description of Prior Art

Various types of arc spray systems have been used to spray molten metal on various types of work pieces. A major difficulty encountered with these systems is that they have been bulky and heavy which renders them very difficult to use in confined spaces such as encountered in the ship building and ship repair industry. Another difficulty is encountered in prior portable systems where movement of the feed wire head causes the mismatching of electrodes. Moreover, the supply of power, feed wire and high pressure gas to the head of prior systems has been by separate leads which has resulted in cumbersome systems. Another major problem encountered in prior systems has been equipment failure and shut down upon the occurrence of the feed wires becoming shorted or welded together during metal spraying operations.

These problems have been overcome by the present invention by providing light weight and compact head and supply lead designs that not only make the equipment more portable but also improve performance. Equipment failure and shut down when the feed wires become shorted or welded together has been overcome by providing a method of temporarily stopping the wire feed in order to allow the atomization to continue.

SUMMARY OF THE INVENTION

Briefly the present invention comprises an apparatus and method for spraying molten metal that is light weight, requires low maintenance and is quick and simple to operate. A feed system is provided that uses an electric motor and control system to push the electrodes to the head and to prevent system failure upon the occurrence of the feed wires becoming shorted or welded together by temporarily stopping the feed. A portable head is provided employing parallel lead guides that allows complete head manipulation without electrode mismatch. An atomizing gas nozzle is also provided that permits lower air pressure and compensates for arc wander. A lead system is provided that combines into one lead the feed wire guides, current leads and the atomizing gas. The atomizing gas also becomes a coolant allowing lighter current leads for arc metal spraying.

STATEMENT OF THE OBJECTS OF THE INVENTION

An object of the present invention is to provide a more effective and economical arc metal spray apparatus.

Another object of the present invention is to provide a more economical and effective method of arc metal spraying.

Still another object of the present invention is to provide an arc metal spray head design that is more effective and convenient to use.

Still another object of the present invention is to provide an arc metal spray supply lead that is more effective and convenient.

A further object of the present invention is to provide an effective and portable single head arc metal spray system.

A still further object of the present invention is to provide an effective and portable multi-head arc metal spray system.

A still further object of the present invention is to provide an apparatus for preventing equipment failure and shut down upon the occurrence of the feed wires becoming shorted or welded together.

A still further object of the present invention is to provide a method for preventing equipment failure and shut down upon the occurrence of the feed wires becoming shorted or welded together.

Other objects, advantages and novel features of the invention will become apparent from the following detailed description of the invention when considered in conjunction with the accompanying drawings wherein:

BRIEF DESCRIPTION OF THE DRAWINGS

FIG. 2 is a sequence of timing diagrams showing the condition of the arc metal spray head upon the occurrence of the feed wires becoming shorted or welded together in prior art systems;

FIG. 3 is a sequence of timing diagrams showing the condition of the arc metal spray head upon the occurrence of the feed wires becoming shorted or welded together in the present invention;

FIG. 4B is a top elevation of the portable signle head arc metal spray system of FIG. 4A;

FIG. 5 is a sectional view of the gear box taken at section 5—5 of FIG. 4B;

FIG. 6 is a sectional view of the gear box taken at section 6—6 of FIG. 4B;

FIG. 7 is an exploded view of the lead coupling and supply lead cable used in FIGS. 4A and 4B and in accordance with the present invention;

FIG. 8A is a sectional side elevation view of the lead cable and the braid capture coupling used in FIG. 7;

FIG. 8B is an end view of the end assembly taken at 8B—8B of FIG. 8A;

FIG. 9 is an end view of the liner capture member taken at section 9—9 of FIG. 7;

FIG. 10 is an exploded view of the hand held junction box, supply coupling, air conduit, electrode tips, electrode capture member and shield of the present invention;

FIG. 11 is an end view of the supply coupling taken at section 11—11 of FIG. 10;

FIG. 12A is a top sectional view of the electrode capture member used in the hand held junction box;

FIG. 12B is an end sectional view of the electrode capture member taken at 12B—12B of FIG. 12A;

FIG. 13A is a top elevation sectional view of the air conduit taken at 13A—13A of FIG. 13B;

FIG. 13B is an end view of the air conduit;

FIG. 14A is a top elevation of the shield used with the portable arc spray system of FIGS. 4A, 4B and 10;

FIG. 14B is a front view of the shield taken at 14B—14B of FIG. 14A;

FIG. 14C a rear view of the shield taken at 14C—14C of FIG. 14A;

FIG. 15A is a top elevation of the shield preferably used with the machine arc spray system of FIG. 16;

FIG. 15B is a rear view of the shield of FIG. 15A;

FIG. 19 is a schematic front elevation of the multiple arc metal spray system taken at section 19—19 of FIG. 18;

FIG. 20 is a schematic side elevation of the multiple arc metal spray system taken at section 20—20 of FIG. 19;

FIGS. 23A—23C are elevation views of an alternate embodiment of the single head arc spray system.

DESCRIPTION OF THE PREFERRED EMBODIMENT

Figure 1:
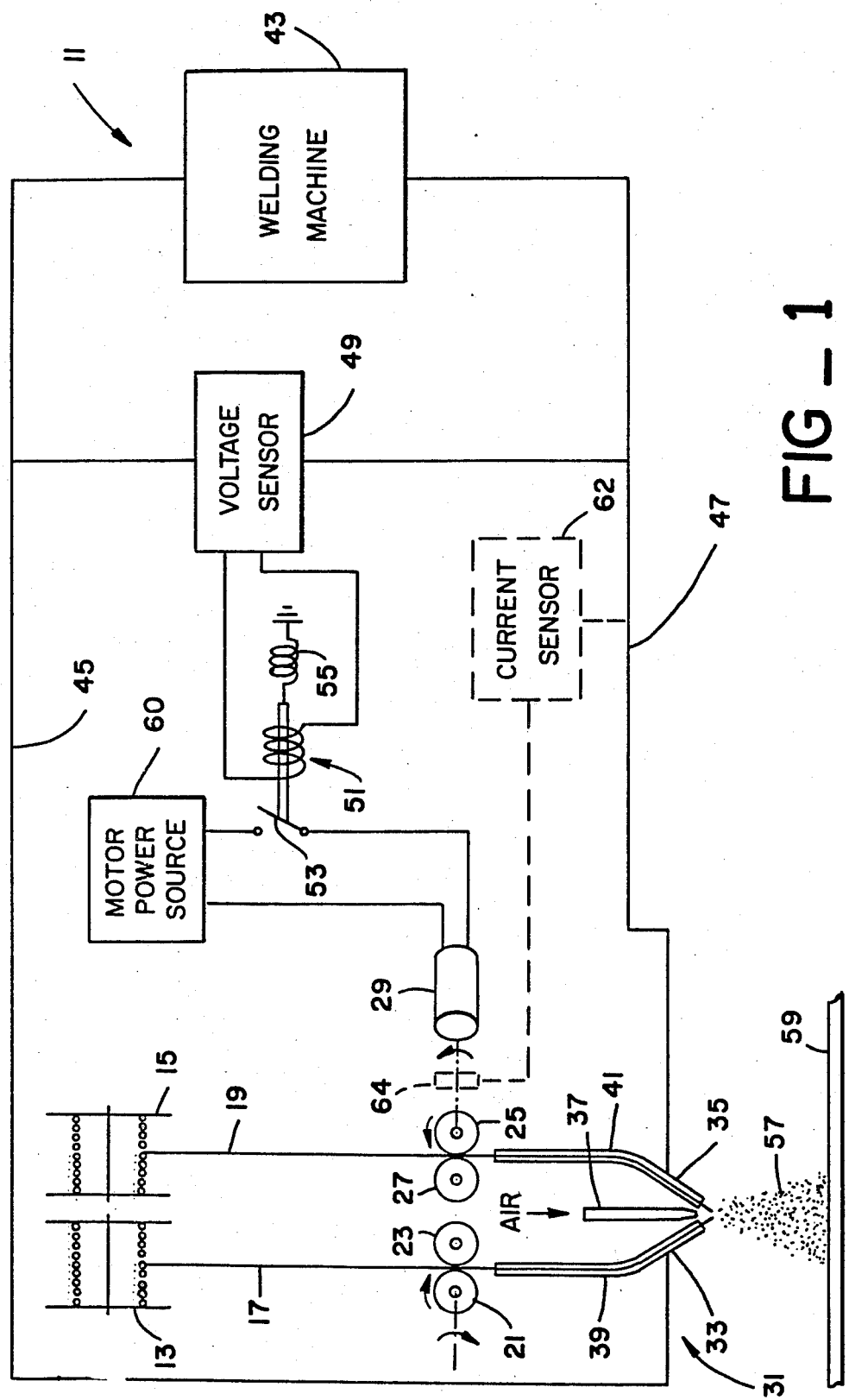
FIG. 1 is a schematic drawing of the apparatus and method of the present invention for preventing equipment failure and shut down upon the occurrence of the feed wires becoming shorted or welded together.

The arc spray system 11 of the present invention is schematically illustrated in FIG. 1. This system includes two rolls 13 and 15 of consumable feed wire 17 and 19 that are used for arc spraying. Feed wire 17 is fed by a drive unit comprising drive roller 21 and idler roller 23. Feed wire 19 is fed by a drive unit comprising drive roller 25 and idler roller 27. Both drive rollers 21 and 25 are driven at the same speed by motor 29. The arc spray system includes a spray gun 31 including electrode tips 33 and 35 that are made of conducting material and are bent to nearly intersect at their ends. It also includes feed wire guides 39 and 41 made of dielectric material. Feed wires 17 and 19 respectively pass through electrode tips 33 and 35 and intercept as they emerge from the electrode tips. A high velocity compressed air stream passes through air conduit 37 and discharges near the ends of the electrodes where feed wires 17 and 9 intercept. The electrode tips 33 and 35, respectively, supply electrical power to feed wires 17 and 19 via power cables 45 and 47. Power is provided by welding machine 43 which typically supplies DC power at 35 volts and high amperage ratings up to 1,000 amps, for example. A voltage sensor 49 is connected across lead wires 45 and 47 to sense a voltage drop (a drop from 35 volts to less than 20 volts, for example) across the lead wires. When the voltage is at the normal operating value, (35 volts, for example), solenoid 51 is actuated which closes switch 53, as shown. When the voltage drops below a predetermined value then current is removed from the solenoid and spring 55 opens switch 53.

In operation, two consumable feed wires 17 and 19 are fed into arc spray gun 31 by drive rollers 21 and 25 (which are both driven by motor 29) through feed wire guides 39 and 41 and through electrode tips 33 and 35, respectively. In the electrode tips, current is transferred to feed wires 17 and 19 from weld machine 43. As wires 17 and 19 emerge from the gun on intersecting paths, an arc is created that melts the wires at their point of intersection. Air conduit 37 discharges high velocity compressed air on the molten metal that generates an atomized molten metal 57 that is projected onto the work piece 59 to be coated.

The above defined process is well known to those skilled in the art. However, a major difficulty encountered in the prior art systems is that the two feed wires short or weld together at their points of intersection and cause system failure. For prior art systems this failure process is shown in FIG. 2 which shows the sequence of steps at times $t_1$, $t_2$, $t_3$, $t_4$ and $t_5$. At times $t_1$ and $t_2$ the system is working properly wherein atomized molten metal 57 is being generated and projected onto work piece 59. However, at time $t_3$ the consumable feed wires 17 and 19 become shorted and/or welded together. This condition may occur for a variety of reasons and is one form of failure. As shown at times $t_4$ and $t_5$, the wires are continuing to be fed and at time $t_5$ there is a system failure. This is because at time $t_3$ the wires become shorted and/or welded together and the current resistance drops which generates a large current flow and heat in wires 17 and 19. At time $t_4$ this condition continues and excessive heat is being generated in wires 17 and 19. This excessive heat and wire melting generally occurs in electrode tips 33 and 35 or feed wire guides 39 and 41 of FIG. 1 and results in system failure by damage to the feed wire guides or to the electrode tips. When this occurs, the system must be shut down and one or both of the electrode tips or feed wire guides must be replaced.

This system mode of failure has been overcome by the FIG. 1 system of the present invention as explained in conjunction with the steps shown in FIG. 3. FIG. 3 shows the process practiced by the present invention which overcomes the system failure previously described with respect to prior art systems. In FIG. 3 the sequence of steps occur at times $t_1$, $t_2$, $t_3$, $t_4$ and $t_5$ as shown. At times $t_1$ and $t_2$ the system is working properly wherein atomized molten metal 57 is being generated and projected onto work piece 59. However, at time $t_3$ the feed wires become shorted and/or welded together which is the same condition that occurred with the above FIG. 2 prior art system. In accordance with the FIG. 1 system, when wires 17 and 19 become shorted and/or welded at time $t_3$, switch 53 is opened and motor 29 stops driving drive rollers 21 and 25 and the feed of wires 17 and 19 stops. This is accomplished by sensing the voltage drop across wires 45 and 47 by voltage sensor 49 which removes power from solenoid 51 when the voltage becomes less than a predetermined value. It has been found that stopping the feed at time $t_3$ will generate sufficient heat at the shorted or welded region to cause it to melt by time $t_4$ so that the high velocity air will again atomize the molten metal and project it towards the work piece 59. At time $t_5$ the atomizing process is normal and the wire feed is in operation. It should be noted that a transient condition may be present from slightly before time $t_3$ to slightly before time $t_5$. That is, when the wires are starting to weld there is a voltage drop that takes place over a period of time and will eventually reach zero. Also, as the melt is formed at time $t_4$ and atomizing starts, there is a voltage rise that takes place over a period of time. The voltage sensor 49 senses a voltage at a predetermined level for both stopping and starting the motor during these voltage drop and rise periods. The particular voltage value selected for operation of the voltage sensor may be dependent upon the voltage output of the welding machine 43, the type of solenoid 51 and switch 53 used, the size and material of feed wires 17 and 19 and other system factors. The main determination of this value is that it be selected to stop the wire feed process as soon as possible after shorting or welding of wires 17 and 19 starts to occur and to start the feed process as soon as possible after the wires start melting and atomization starts. In this embodiment, this is accomplished by applying or removing power from motor power source 60 by closing or opening switch 53. It should also be understood other methods of sensing these conditions may be employed. For example, instead of a voltage sensor, a current sensor (not shown) could be employed to sense the current in a lead wire, for example lead wire 47, and actuate a clutch (also not shown) to engage or disengage the motor 29 from the drive rollers 21 and 25. In this mode, the clutch would be disengaged when the current level is above a predetermined amount and engaged when below a predetermined amount. In addition, various optical, heat or acoustic sensors might be employed to detect the presence or absence of the shorting and/or welding of feed wires 17 and 19.

It is to be understood that the feed wires may be stopped by means other than those described above. The wire feed may be stopped by stopping motor, braking the wire drive rollers, disengaging the clutch or by other methods known to those skilled in the art. For example, a clutch may be used in the output shaft of motor 29 in place of disconnecting the power to motor 29 by switch 53. The clutch will become disengaged at the same time that switch would be opened. Moreover, a motor brake could also be employed when switch 53 is opened to achieve more rapid stopping of the feed wires.

Figure 4A:
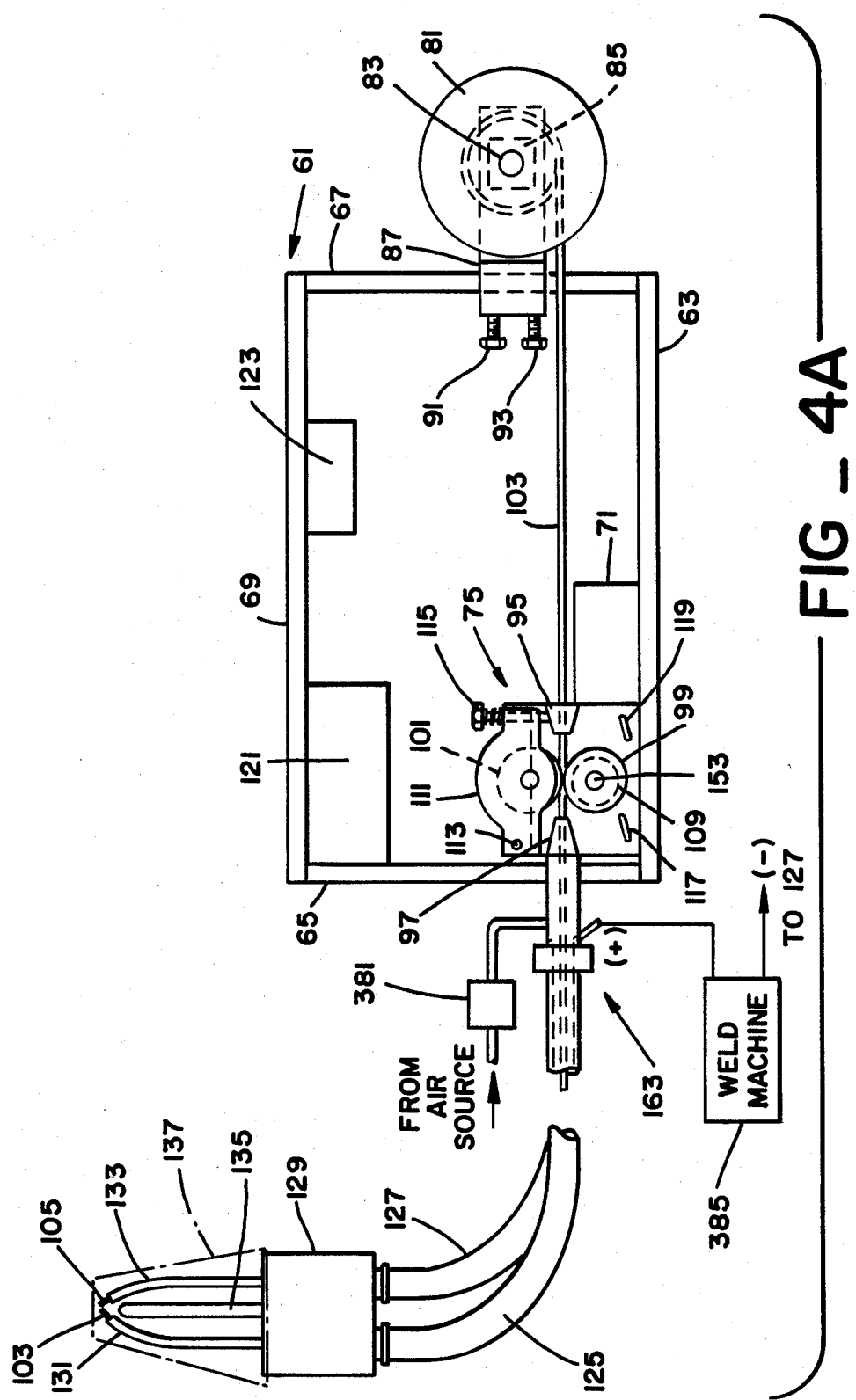
FIG. 4A is the side elevation of the portable single head arc metal spray system of the present invention.

In FIGS. 4A and 4B are shown the elevations of a portable single head arc metal spray system 61 of the present invention. This system includes a frame having a base 63, vertical members 65 and 67, and horizontal member 69 that is connected to the upper ends of posts 65 and 67. Mounted on base 63 are motor 71, gear box 73 and feed wire drive units 75 and 77. Feed wire rolls 79 and 81 are rotatably mounted on shaft 83 which is supported by bearing 85. Bearing 85 is supported by movable support member 87 which has an opening 89 that surrounds vertical member 67. Movable support member 87 is locked in place to vertical member 67 by means of bolts 91 and 93 to hold the feed wire rolls 79 and 81 in the desired position.

Feed wire drive units 75 and 77 are the same and include feed wire guides 95 and 97, drive roller 99, idler roller 101. Feed wire 103 and 105 are respectively driven by drive units 75 and 77. The feed wire is positioned between drive roller 99, having groove 109, and idler roller 101. The idler roller 101 is supported by member 111 that rotates about pivot 113 and is held in forced contact by spring biased bolt 115. Lock members 117 and 119 hold feed wire guides 95 and 97 in place. Motor speed control unit 121 is mounted on vertical member 65 and horizontal member 69. Voltage sensor and control unit 123 is mounted on horizontal member 69. The supply lead cables 125 and 127 carry air, power and feed wire as hereinafter described in detail. The lead cables terminate at junction box 129. Extending from junction box 129 are electrode tips 131 and 133 which transfer power to lead wires 103 and 105 respectively. High pressure air is transmitted through air conduit 135. A shield 135 may be employed to protect the electrode tips, air conduit feed wires, and the operator.

In FIG. 5 is shown a section view taken at section 5—5 of FIG. 4B. This view shows gear box 73 including drive shaft 139, bearings 141 and 143, pinion gear 145, washers 147, worm gear 149 and shaft 153. The motor 71, shown in dotted lines is coupled to drive shaft 139. In FIG. 6 is shown a section view taken at section 6—6 of FIG. 4B. This view shows feed drive roller shaft 153, bearings 155 and 157, worm gear 149, pinion gear 145, base support 163 and upper support 161.

FIGS. 23A-23C and the accompanying description, infra, illustrate an alternate portable single head arc spray system which provides improvement over the apparatus shown in FIGS. 4A and 4B.

FIG. 7 shows an exploded view of the lead coupling 163 and supply lead cable 125 that are connected to feed wire drive unit 75 of FIGS. 4A and 4B. The lead cable 125 includes liner 167, preferably made of Teflon or nylon, electric braided cable 169, and outer liner 171 preferably made of nylabraid. An air feed space 173 is provided between outer liner 171 and electric braided cable 169 and a space 175 is provided between electric braided cable 169 and liner 167 for removing and replacing liner 167. A braid capture coupling 179 has a thin wall braid capture section 181 and a threaded section 183. FIGS. 8A and 8B show the end assembly 185 of the end of lead cable 125 and braid capture coupling 179. The electric braided cable 169 is held in place and electrically connected to braided capture coupling 179 by brazing the thin wall of braided capture section 181. The end assembly 185 is used at both ends of each of lead cables 125 and 127 Liner capture member 187 as shown in FIGS. 7 and 9 includes liner retainer section 189, air cavity 191, feed member section 193 and a plurality of air openings 195. Attachment section 197 is a collar having a threaded opening 199 into which air base fitting 201 is connected. The lead connection 203 from the welding machine is welded or brazed to the exterior of attachment section 197. The feed wire 103 passes through opening 207 of feed member 205 to enter the liner 167 in liner capture member 187. This structure allows the wire 103 to feed smoothly through liner 167 uninterrupted from the feeder to the contact tubes.

In FIG. 10 is shown an exploded view of the hand held junction box 129, coupling 209, air conduit 135, electrode tips 131 and 133, electrode capture member 229, and shield 137 of FIGS. 4A and 4B. Supply coupling 209 includes an outer liner support having serrated edges 217, circular members 219 and 221 including O-ring grooves 223 and 225, respectively, an air cavity 227, electrode capture member 29 and a plurality of air openings 231 as best shown in FIG. 11. The supply lead cable 125 is terminated with the configuration shown with the liner 167 extending to electrode capture member 229. Cable 125 is connected to coupling by engaging threaded section 183 with threads 233 of coupling 209 and tightening outer liner 171 against the serrated edges of outer liner support 217 by an exterior band clamp 235. When assembled, high pressure air in air feed annular cavity 173 communicates directly with air openings 231 that communicate directly with air cavity 227.

The junction box 129 includes a base block 237 having cylindrical coupling cavities 239 and 241, cylindrical electrode capture cavities 243 and 245 and air conduit capture cavity 247. Air opening 249 communicates with cavities 239 and 241 in a region that communicates directly with annular air cavities 227 of the assembled couplings 209. Air opening 249 communicates directly with air opening 251 that communicates directly with air conduit 135 that has one end captured in cavity 247. When assembled, air passes through annular cavities 173 of supply lead cables 125 and 127. It then passes through openings 231, annular cavities 227, opening 249, opening 251, and into air conduit 135 that is captured in capture cavity 247.

The base block 237 also includes openings 261 and 263 that connect cavity 239 with cavity 243 and cavity 241 with cavity 245, respectively. Block 237 also includes openings 265 and 267 through which the ends of electrodes 131 and 133 may be inserted. As best shown in FIGS. 12A and 12B, each electrode capture member 213 includes electrode capture cylinder 253, slot 255 that extends the length of cylinder 253 and permits its reduction in diameter, bolt opening 257 and female threads 259 for engaging bolts, (not shown). When assembled two electrode capture members 213 are inserted into cavities 243 and 245, respectively, the ends of electrode tips 133 and 131 are inserted through openings 265 and 267, respectively, and into electrode capture member 229 and captured by closure of slots 255 by bolts engaging threads 259. When assembled, power is conducted through braided cable 169, wall 181, section 183, coupling 209 including member 229, and to the inserted end of electrode 133. Feed wire 103 and 105 is fed through the various aligned cavities, as shown in FIG. 10, and then through electrode tips 131 and 133, respectively.

In FIGS. 13A and 13B are shown the details of an air conduit 35 that has been found to be particularly satisfactory when using lower air pressures as permitted by the present invention. At lower air pressures the arc tends to wander which is overcome by this air conduit. Air conduit 135 includes an enlarged interior cavity 271, a slot shaped outlet opening 273, and exterior grooves 275 and 277. The shape of the air slot 273 is best shown in FIG. 13B where it has a width of about 5/16 inch, a height of 5/64 inch and rounded sides having a 5/64 diameter.

In FIGS. 14A, 14B and 14C is shown shield 137 that has been found to be particularly useful in portable hand held operations. Shield 137 includes a tapered section 279 that terminates in an outlet opening 281 having a flange 283, and enlarged inlet opening 285 having slots 287. Enlarged opening is inserted over junction box 129 of FIGS. 4A and 10 and held in place by bolts, not shown, engaging the surface near slots 287. Shield 137 provides protection for electrode tips 131 and 133 and air conduit 135. In FIGS. 15A and 15B is shown a shield 137 that is rectangular in configuration, and includes slots 289 for attachment to junction box 129. This shield has been found useful for stationary machine operations.

Figure 16:
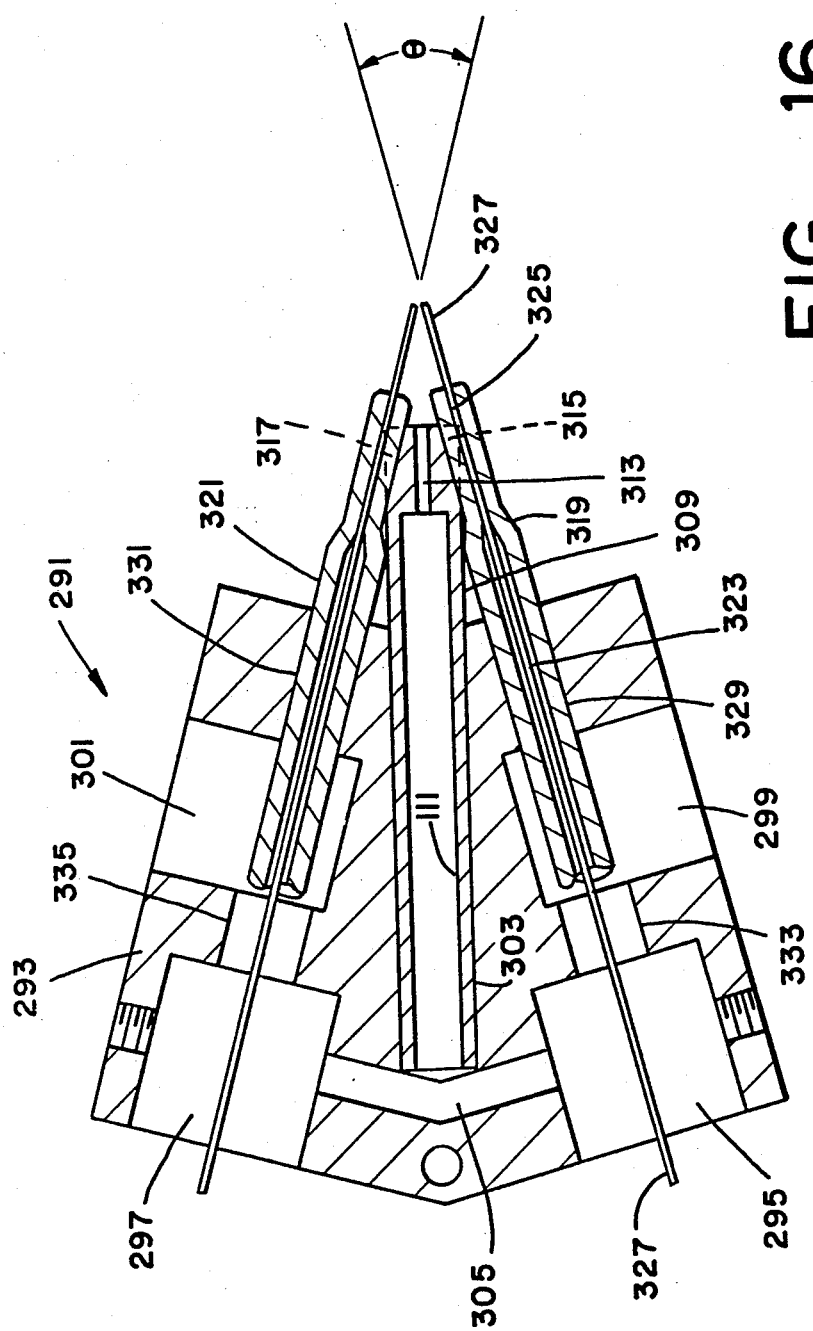
FIG. 16 is a top elevation, partly in section, of the machine junction box for supplying power, feed wire and high pressure air for arc metal spraying.

In FIG. 16 is shown a machine junction box 291 that is useful for machine or non-hand held operations. Junction box 291 is different from hand held junction box 129 of FIG. 10 in that the alignment of the feed wires are at the desired intersect angle of $\Theta = 30°$ This angular alignment provides for a direct in-line feed of the feed wires which avoids any binding of the feed wires in the electrode tips.

Junction box 291 includes base block 293 having cylindrical coupling cavities 295 and 297, cylindrical electrode capture cavities 99 and 301 and air conduit capture cavity 303. Air openinng 305 communicates with cavities 295 and 297 in a region that communicates directly with annular air cavities 227 of the assembled couplings 209 as shown in FIG. 10. Air conduit capture cavity 303 communicates directly with air opening 305. When assembled, air will pass from air opening 305 directly into air conduit 309. Air conduit 309 includes an enlarged cavity 311 and a small high velocity section 313. The tip includes grooves 315 and 317 to accommodate electrode tips 319 and 321. Each electrode tip has an enlarged cavity 323 and a small cavity 325. The small cavity has a diameter that is slightly larger than the diameter of the feed wire 327. Base block 293 also includes opening 329 and 331 through which pass electrode tips 319 and 321, respectively, and openings 333 and 335 through which electrode capture member 229 of supply coupling 209 passes as best shown in FIG. 10.

Figure 17:
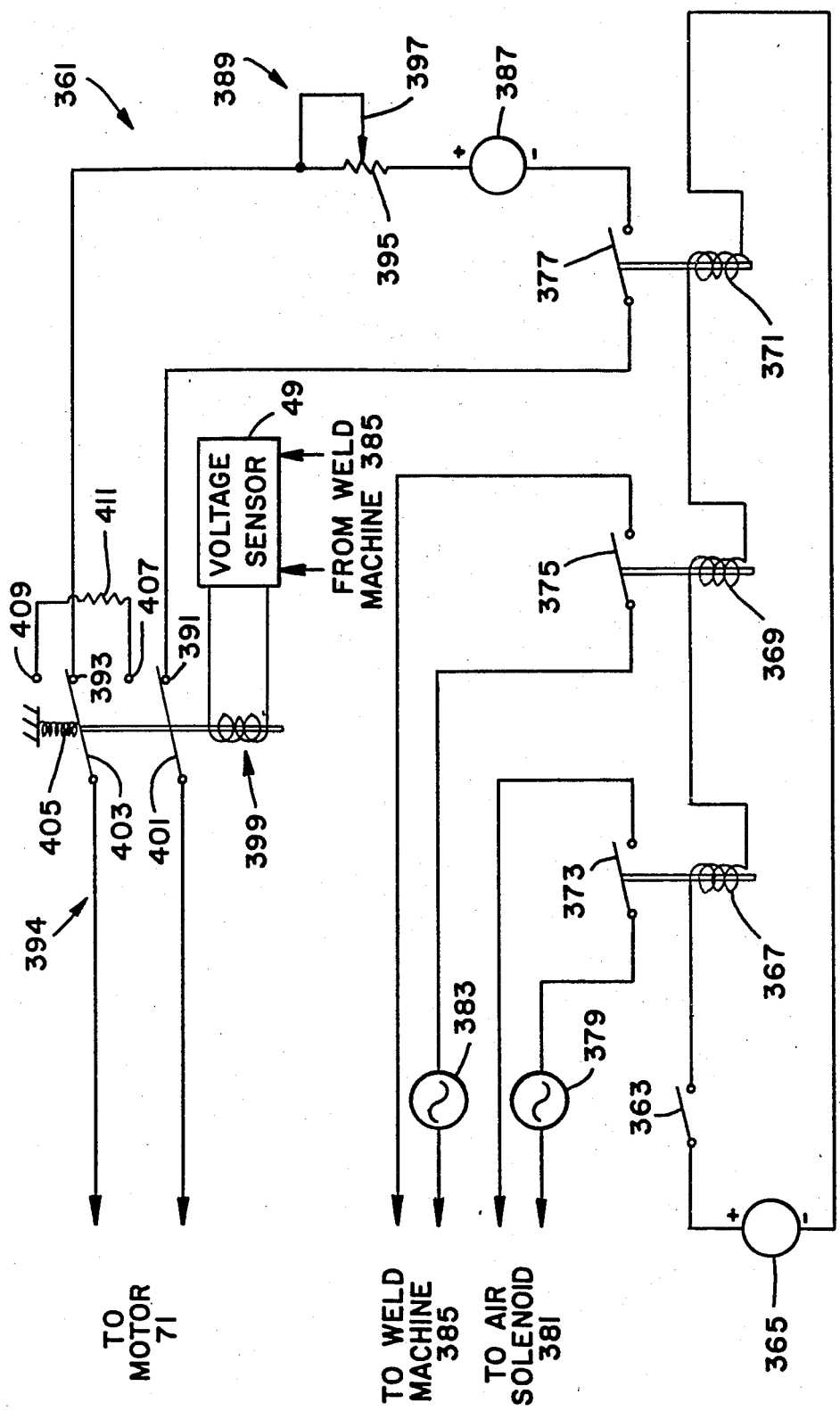
FIG. 17 is a schematic drawing of the control system for operating the single and multiple head arc metal spray systems of the present invention.

In FIG. 17 is shown the control system 361 used for operating the arc metal spray system of FIGS. 4A and 4B. Control system 361 includes a hand switch 363 for connecting a DC power source 365, for example, to solenoids 367, 369, 371 which are respectively connected to switches 373, 375 and 377. When switch 363 is open, switches 373, 375 and 377 will be open and when switch 363 is closed, switches 373, 375 and 377 will be closed. When switch 373 is closed, power from AC power source 379 is applied to air solenoid 381 of FIG. 4A. This opens solenoid 381 and furnishes high pressure air to supply lead cables 125 and 127. When switch 375 is closed, power from AC power source 383 is applied to weld machine 385 of FIG. 4A. This turns on the weld machine to supply positive and negative DC power to lead cables 125 and 127. When switch 377 is closed, DC power source 387 is connected through potentiometer 389 to terminals 391 and 393 of relay 394. The potentiometer 389 includes a resistor 395 and a wiper arm 397 wherein the position of the wiper arm determines the voltage level applied to motor 71 of FIG. 4B. The speed of motor 71 and the feed rate of feed wires 103 and 105 are determined by the voltage level determined by speed control potentiometer 389. Relay 394 includes solenoid 399, ganged switch blades 401 and 403, spring 405 and terminals 407 and 409. Resistor 411 is placed across terminals 407 and 409. The DC output voltage from weld machine 385 of FIG. 4A is applied to voltage sensor 49. When the voltage output from the weld machine falls below a predetermined level, the relay switches so that blades 401 and 403 are in contact with terminals 407 and 409 respectively. This puts load resistor 411 across the input of motor 71 which causes motor braking and immediately stops the feed of feed wires 103 and 105 of FIGS. 4A and 4B. This causes the vaporization process of the lead wires to continue and the weld machine voltage to rise. When the voltage from the weld machine 385 rises to a predetermined level, voltage sensor 49 actuates solenoid 399 which connects blades 401 and 403 to terminals 391 and 393. This turns on feed motor 71 and reinitiates the feed of feed lines 103 and 105. A more complete description of this operation was previously described with respect to FIGS. 1, 2 and 3.

Figure 18:
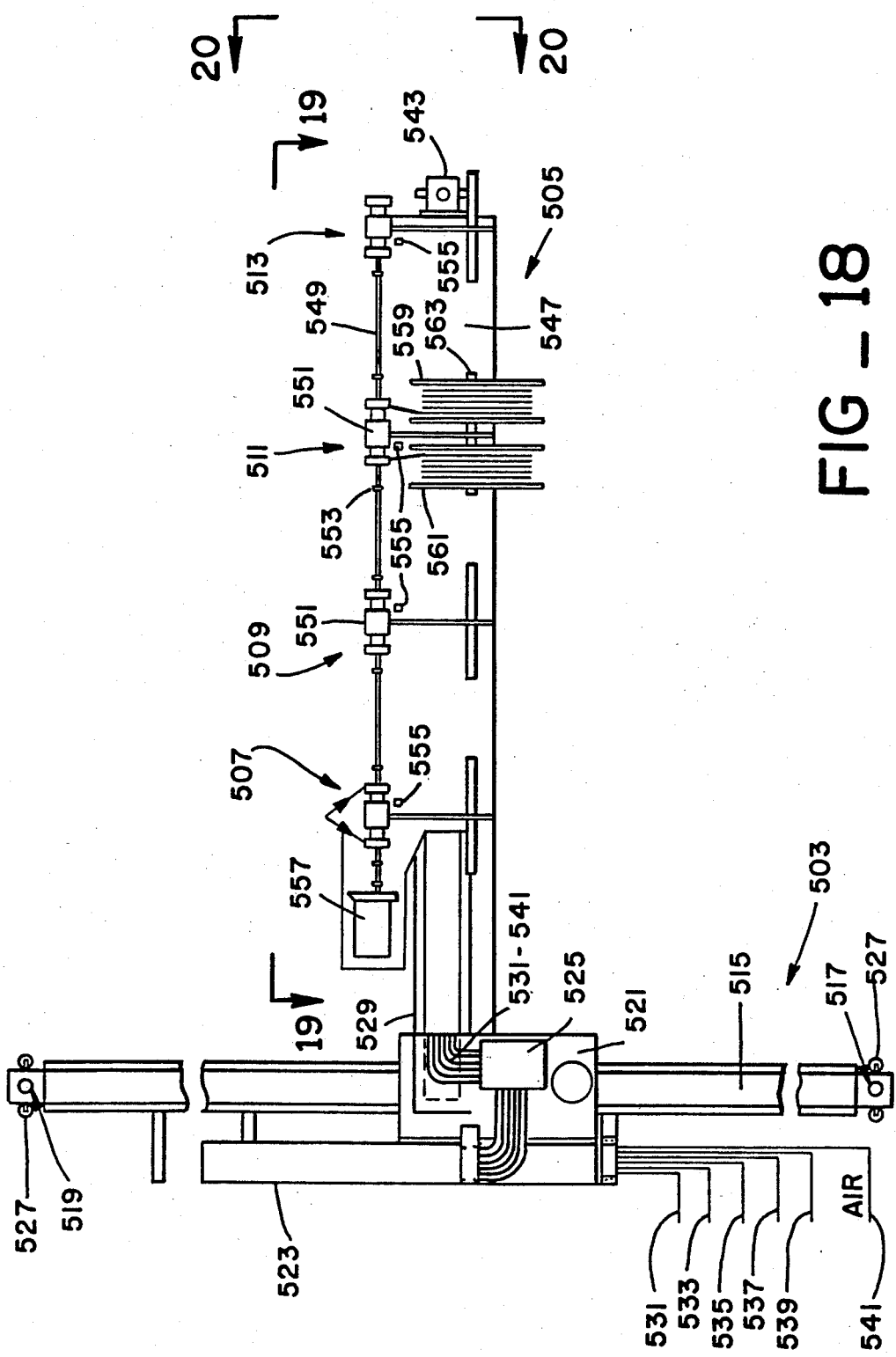
FIG. 18 is a schematic top elevation of a multiple head arc metal spray system of the present invention.

FIGS. 18, 19 and 20 illustrate a portable multi-head arc metal spray system according to the present invention.

Referring to FIG. 18 the multi-head arc spray system 501 includes a longitudinal carriage system 503 and a transverse carriage system 505. The primary function of the longitudinal carriage 503 is to support and move the transverse carriage 505, including arc spray units 507, 509, 511 and 513, in the longitudinal direction. The primary function of the transverse carriage is to support and/or move arc spray units 507, 509, 511 and 513 in the transverse direction.

The longitudinal carriage system includes I-beam 515, adjustable lift jacks 517 and 519 for supporting the I-beam, movable carriage 521, power track 523, junction box 525 mounted on carriage 521, stops 527 and the end of I-beam 529 of the transverse carriage system 505. Power is provided by four separate power lines 531, 533, 535 and 537 and common ground line 539 from welding power sources (not shown). High pressure air is provided by line 541. These power and air lines are carried in a conventional power track 523 that follows the carriage 521 to prevent excessive bending of the lines.

Transverse carriage system 505 includes I-beam 529, adjustable lift jack 543 for supporting one end of I-beam 529, movable carriage 547, cables 531, 533, 535, 537, 539 and 541, four arc spray units 507, 509, 511 and 513, wire feed drive shaft 549, bearing blocks 551, couplings 553, air solenoids 555 and wire feed drive motor 557. Each arc spray unit includes feed wire reels 559 and 561 that are rotatably supported by shaft 563 that is supported by stand 565, wire feed assemblies 567 and 569, supply lead cables 571 and 573, a gun head 575 that is supported by member 577, electrode tips 579 and 581, and high pressure air conduit 583. The wire feed assembly 569 is similar to that previously described and shown in FIG. 4A. The transverse carriage system 505 also includes I-beam 529, round rails 585, 587 that extend the length of I-beam 529, carriage motor 589, gear box 591, pinion gear 593 and gear rack 595.

Figure 21:
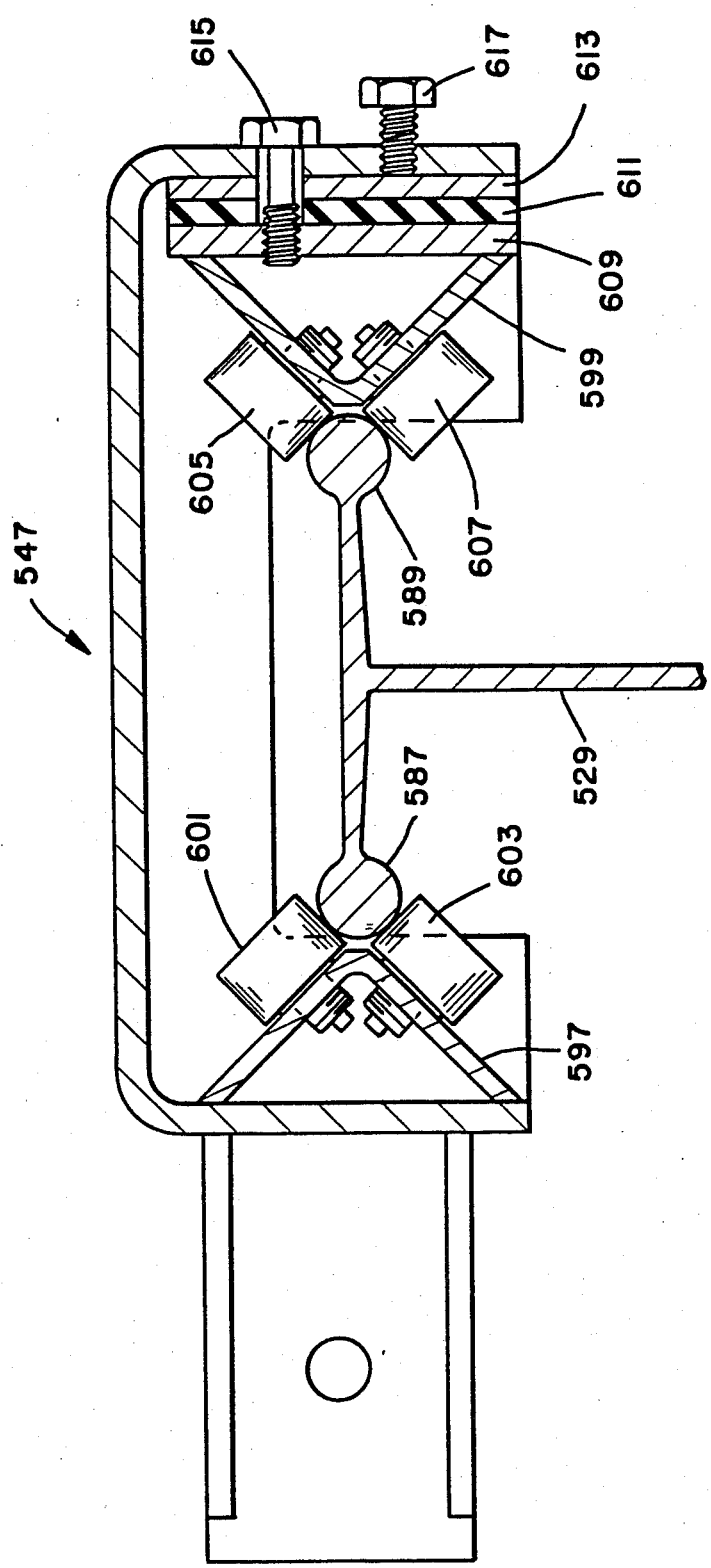
FIG. 21 is an enlarged end view of the I-beam and carriage of FIG. 20.

As best shown in FIG. 21, movable carriage 547 includes right angle beams 597 and 599, rollers 601 and 603 mounted on beam 597, rollers 605 and 607 mounted on beam 599, adjustable plate 609, rubber cushion plate 611, pressure plate 613, bolt 615 and bolt 617. Round rails 587 and 585 and I-beam 529 are preferably made of aluminum to reduce weight to make the unit portable. To compensate for misalignment and wear, the rollers are kept tight against round rails 587 and 585. This is achieved by loosening bolt 615 and tightening bolt 617. The rubber cushion plate 611 maintains a constant pressure and compensates for misalignment as the carriage moves along the rail.

Figure 22:
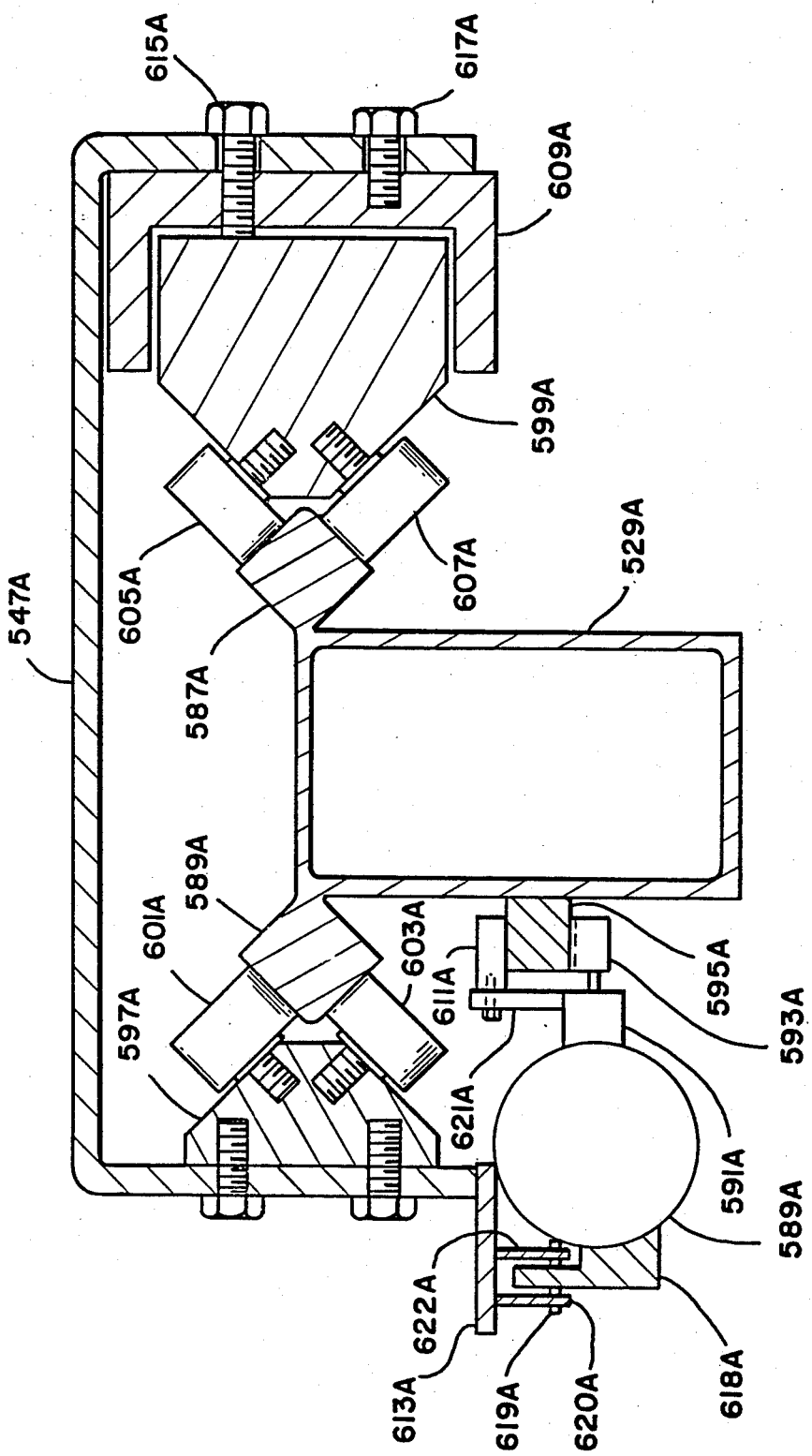
FIG. 22 is an end view of an alternate embodiment of the carriage and rail system for the multihead arc spray system.

FIG. 22 shows an alternate carriage and rail system. Moveable carriage 547A includes right angle bearing support blocks 597A and 599A and support block mounting bracket 609A. Rollers 601A and 603A are mounted on support block 597A. Rollers 605A and 607A are mounted on support block 599A which is held in place and adjustment by mounting bracket 609A and bolts 615A and 617A. Square rails 587A and 585A and box beam 529A are preferably made of aluminum to reduce weight. The bearing support blocks 599A and 597A are precision machined and the rails 585A and 587A are precision aligned to allow smooth movement. The motor 589A is mounted in such a manner to allow up and down movement to keep gear 593A and gear rack 595A in mesh.

Roller 611A is mounted to bracket 621A which is mounted to gear box 591A. Roller 611A rolls on top of gear rack 595A. Roller 611A and pinion gear 593A capture the gear rack 595A between them and maintain gear mesh through the length of carriage movement.

The motor 589A is attached to carriage frame 547A through mounting brackets 613A, 618A, 620A and 622A. Motor 589A is mounted on bracket 618A which is coupled to brackets 620A and 622A by swivel pin 619A. Brackets 620A and 622A are attached to mounting bracket 613A which is mounted on the frame 547A. Brackets 620A and 622A maintain alignment and pin 619A allows up and down movement which is controlled by roller 611A and pinion gear 593A.

FIGS. 23A, 23B and 23C show elevation views of an alternate embodiment of a portable single head arc metal spray system 618 that has improved packaging. This alternate embodiment is portable and easy to handle. All functions may be controlled from the base unit 619 and the electrical controls are protected from field hazards. The electrical components are mounted in a slide drawer for easy access and maintenance.

This sytem includes a frame having a base 619, upright members. 620 and 621, and a horizontal member 622 connected to the upper ends of the vertical members. The horizontal member extends beyond the ends of the upright members 620 and 621 to form handles 623 and 624. An additional handle 625 is attached to horizontal member 622 to provide a center balanced grip for carrying by a single person.

The feed rollers 629 of wire drive units 626 and 627 are gear meshed and driven by gear 628 which is coupled to a motor/gear box 630. The feed wire is held between the top and bottom feed rollers by a spring-biased bolt 631.

A gas regulator 634 is mounted on the horizontal member 622 The gas output from the regulator 634 is coupled to solenoid valve 635. The single output of solenoid valve 635 is coupled to a dual hose connection 636 to provide air to hoses 637 and 638. Hoses 637 and 638 are coupled to a fitting 201 of a lead coupling 163 as shown in FIG. 7. The frame provides an enclosed air passage 639 along horizontal section 623 and upright section 621. Air entering at a fitting 642 and exiting at fitting 640, is coupled by hose 641 to the input of air regulator 634. Base 619 provides cabinet for electrical components and mounting base for motor/gear box 630. Drawer 643 provides mounting surface for electrical components to include motor speed control, voltage sensor and controls, and various switches and meters to operate system. Slide drawer 643 provides easy access to component when field repair is required. Members 621 and 620 attach to base 619 by bolts 644 allowing detachment of frame from base so that the feed system may be employed in locations where the base unit will not enter. Projections 645 provide protection for the electrical switches, motors, and connectors. Plug connection 646 provides interconnection to the welding power supply for power, contactor control, and voltage control. Connection 647 provides connection to torch switch for starting and stopping system. Switch 648 provides on/off control for 110VAC power and switch 649 provides resistor control for the voltage control system. A potentiometer 650 controls voltage of power supply. Voltmeter 651 reads the voltage across leads going to spray head. A potentiometer 652 controls motor speed that in turn controls amperage. A switch 653 provides momentary control to inch wire through the system without power on leads.

Obviously many modifications and variations of the present invention are possible in the light of the above teachings. It is therefore to be understood that within the scope of the appended claims the invention may be practiced otherwise than as specifically described.

What is claimed is:

1. A lead cable for arc metal spray apparatus for carrying power, high pressure gas, and spray wire to a spray head having contact tips, which comprises:
    (a) a cylindrical inner liner of electrically insulating material through which the spray wire passes, uninterrrupted to the contact tips;
    (b) a cylindrical braided conducting cable, concentric with and surrounding said inner liner for providing electrical power to the spray head; and
    (c) an outer cylindrial liner of concentric with and surrounding said braided cable, the inner wall of said liner being disposed away from said braided cable to provide an annular passage for high pressure gas to the spray head; and
    wherein the inner surface of said braided cable is disposed away from the outer surface of said inner liner to provide an annular passage and further including an end assembly comprising:
    (d) a braid capture cylindrical coupling having a thin wall braid capture section and an externally threaded section, said thin wall section being disposed between the outer surface of said braided cable and the inner surface of said outer liner and fixed to said braided cable to provide electrical connection between the braided cable and the capture coupling;
    (e) a capture member having a longitudinal channel, said longitudinal channel having at a first end a first threaded section configured to mate with the externally threaded section of the braid capture coupling and a second threaded section at the other end, the outer surface of said capture member having a first section to which the outer liner of said lead cable may be secured and an annular groove around the central portion thereof forming an annular air cavity, said capture member further including longitudinal passages from said annular groove through said capture member toward said first end;
    (f) a collar for mating with the capture member at said second end, said collar having a passage communicating with the annular air cavity of said capture member for suolying pressurized gas to said lead cable, said collar having means for attachment of an electrical power lead; and
    (g) a feed member having external threads for mating with the second threaded section of said capture member, said feed member having a central passage through which the spray wire passes.

2. A lead cable as recited in claim 1 wherein the outer surface of said capture member at said first section has serrated edges against which said outer liner may be secured.

3. A lead cable as recited in claim 1 wherein said passage in said collar is an internally threaded cylinder for receiving an air base fitting.

4. A lead cable for arc metal spray apparatus for carrying power, high pressure gas, and spray wire to a spray head having contact tips, which comprises:
    (a) a cylindrical inner liner of electrically insulating material through which the spray wire passes, uninterrupted to the contact tips;
    (b) a cylindrical braided conducting cable, concentric with and surrounding said inner liner for providing electrical power to the spray head; and
    (c) an outer cylindrical liner of electrically insulating material concentric with and surrounding said braided cable, the inner wall of said outer liner being disposed away from said conducting cable to provide an annular passage for high pressure gas to the spray head; and wherein the inner surface of said braided cable is disposed away from the outer surface of said inner liner to provide an annular passage and further including an end assembly comprising:
    (d) a braid capture cylindrical coupling having a thin wall braid capture section and an externally threaded section, said thin wall section being disposed between the outer surface of said braided cable and the inner surface of said outer liner and fixed to said braided cable to provide electrical connection between the braided cable and the capture coupling; and
    (e) a head adaptor coupling having a longitudinal channel, said channel having at a first end a first threaded section configured to mate with the externally threaded section of the braid capture coupling and an adaptor section at the other end, the outer surface of said head adaptor coupling having a first section to which the outer liner of said lead cable may be secured and an annular cavity around the central portion thereof, said adaptor coupling further including longitudinal passages from said annular cavity to the first end of said adaptor coupling.

5. A lead cable for arc metal spray apparatus for carrying power, high pressure gas, and spray wire to the spray head having contact tips, which comprises:
    (a) a cylindrical inner liner of electrically insulating material through which the spray wire passes, uniterrupted to the contact tips;
    (b) a cylindrical conducting cable, concentric with and surrounding said inner liner for providing electrical power to the spray head; and
    (c) an outer cylindrical liner of electrically insulating material concentric with and surrounding said conducting cable, the inner wall of said outer liner being disposed away from said conducting cable to Provide an annular passage for high pressure gas to the spray head; and further including an end assembly comprising:
    (d) a first cylindrical capture coupling having a thin wall capture section and an externally threaded section, said thin wall section being disposed between the outer surface of said conducting cable and the inner surface of said outer liner and fixed to said conducting cable to provide electrical connection between the conducting cable and the capture coupling;
    (e) a capture member having a longitudinal channel, said longitudinal channel having at a first end a first threaded section configured to mate with the externally threaded section of the first capture coupling and a second threaded section at the other end, the outer surface of said capture member having a first section to which the outer liner of said lead cable may be secured and an annular groove around the central portion thereof, said capture member further including longitudinal passages extending through said capture member between said annular groove and the first end of said capture member;
    (f) a collar for mating with the capture member at said second end, said collar surrounding said annular groove to provide an annular air cavity, said collar having a passage communicating with the annular air cavity for supplying pressurized gas to said lead cable; and (g) a feed member having external threads for mating with the second threaded section of said capture member, said feed member having a central passage through which the spray wire passes.

6. A lead cable as recited in claim 5 further including a second end assembly comprising:

(a) a second capture cylindrical coupling having a thin wall conducting cable capture section and an externally threaded section, said thin wall section being disposed between the outer surface of said conducting cable and the inner surface of said outer liner and fixed to said conducting cable to provide electrical connection between the conducting cable and the second capture coupling: and (b) a head adapter coupling having a longitudinal channel, said channel having at a first end a first threaded section configured to mate with the externally threaded section of the second capture coupling and an adapter section at the other end, the outer surface of said head adapter coupling having a first section to which the outer liner of said lead cable may be secured and an annular cavity around the central portion thereof, said adapter coupling further including longitudinal passages from said annular cavity to the first end of said adapter coupling.

7. A lead cable as recited in claim 6 where said cylindrical conducting cable is a cylindrical braided conducting cable.

8. A lead cable as recited in claim 6 wherein the outer surface of said capture member at said first section has serrated edges against which said outer lines may be secured.

9. A lead cable as recited in claim 6 wherein the outer surface of said adapter coupling at said first section has serrated edges against which said outer liner may be secured.

10. A lead cable as recited in claim 6 wherein said passage in said collar is an internally threaded cylinder for receiving an air base fitting.

11. A lead cable as recited in claim 5 wherein said cylindrical conducting cable is a cylindrical braided conducting cable.

12. A lead cable as recited in claim 5 wherein the outer surface of said capture member at said first section has serrated edges against which said outer liner may be secured.

13. A lead cable as recited in claim 5 wherein said passage in said collar is an internally threaded cylinder for receiving an air base fitting.

14. A lead cable for arc metal spray apparatus for carrying power, high pressure gas, and spray wire to a spray head having contact tips, which comprises:

(a) a cylindrical inner liner of electrically insulaing material through which the spray wire passes, uninterrupted to the contact tips;

(b) a cylindrical conducting cable, concentric with and surrounding said inner liner for providing electrical power to the spray head; and (c) an outer cylindrical liner of electrically insulating material concentric with and surrounding said conducting cable, the inner wall of said outer liner being disposed away from said conducting cable to provide an annular passage for high pressure gas to the spray head; and further including an end assembly comprising:

(d) a second capture cylindrical coupling having a thin wall conducting cable capture section and an externally threaded section, said thin wall section being disposed between the outer surface of said conducting cable and the inner surface of said outer liner and fixed to said conducting cable to provide electrical connection between the conducting cable and the second capture coupling; and (e) a head adapter coupling having a longitudinal channel, said channel having at a first end a first threaded section configured to mate with the externally threaded section of the second capture coupling and an adapter section at the other end, the outer surface of said adapter coupling having a first section to which the outer liner of said lead cable may be secured and an annular cavity around the central portion thereof, said adapter coupling further including longitudinal passages from said annular cavity to the first end of said adapter coupling.

15. A lead cable as recited in claim 14 where said cylindrical conducting cable is a cylindrical braided conducting cable.

16. A lead cable as recited in claim 14 wherein the outer surface of said adapter coupling at said first section has serrated edges against which said outer liner may be secured.

17. Appratus for use in an arc metal spray system for carrying power, high pressure gas, and spray wire to a spray head having contact tips, said apparatus comprising:

(a) first and second lead cables, each said lead cable including:

(1) a cylindrical inner liner of electrically insulating material through which the spray wire passes, uninterrupted to the contact tips;

(2) a cylindrical conducting cable, concentric with and surrounding said inner liner for providing electrical power to the spray head; and (3) an outer cylindrical liner of electrically insulating material concentric with and surrounding said conducting cable, the inner wall of said outer liner being disposed away from said conducting cable to provide an annular passage for high pressure gas to the spray head, (4) a first end assembly including:

(a) a first cylindrical capture coupling having a thin wall capture section and an externally threaded section, said thin wall section being disposed between the outer surface of said conducting cable and the inner surface of said outer liner and fixed to said conduct-ng cable to provide electrical connection between the conducting cable and the capture coupling;

(b) a capture member having a longitudinal channel, said longitudinal channel having at a first end a first threaded section configured to mate with the externally threaded section of the first capture coupling and a second threaded section at the other end, the outer surface of said capture member having a first section to which the outer liner of said lead cable may be secured and an annular groove around the central portion thereof, said capture member further including longitudinal passages extending through said capture member between said annular groove and the first end of said capture member;

(c) a collar for mating with the capture member at said second end, said collar surrounding said annular groove to provide an annular air cavity, said collar having a passage communicating with the annular air cavity for supplying pressurized gas to said lead cable; and (d) a feed member having external threads for mating with the second threaded section of said capture member, said feed member having a central passage through which the spray wire passes;

(5) a second end assembly including:

(a) a second cylindrical capture coupling having a thin wall conducting cable capture section and an externally threaded section, said thin wall section being disposed between the outer surface of said conducting cable and the inner surface of said outer liner and fixed to said conducting cable to provide electrical connection between the conducting cable and the second capture coupling; and (b) a head adapter coupling having a longitudinal channel, said channel having at a first end a first threaded section configured to mate with the externally threaded section of the second capture coupling and an adapter section at the other end, the outer surface of said adapter coupling having a first section to which the outer liner of said lead cable may be secured and an annular cavity around the central portion thereof, said adapter coupling further including longitudinal passages from said annular cavity to the first end of said adapter coupling, and (b) a spray head including a junction block for mating said cables with electrodes and an air conduit, said junction block including for mating with each said cable (1) a coupling cavity adapted to receive the central portion of the head adapter coupling;

(2) an electrode capture cavity;

(3) a first passage between said coupling cavity and said electrode capture cavity;

(4) a second passage between said electrode capture cavity and the front of said junction block for receiving the rear of the electrode;

(5) said coupling cavity, said first passage, said electrode capture cavity, and said second passage being disposed so that said head adapter coupling may be inserted into said junction block with the adapter section extending into said electrode capture cavity and said central section being disposed in said coupling cavity, the rear of said electrode being inserted through said second passage into said adapter section of said head adapter coupling;

(c) said junction block further including;

(1) an air conduit capture cavity disposed between said second passages.

(2) an air passage having a first section communicating between said coupling cavities, and a second section communicating between said first section and said air conduit capture cavity, (3) said air passage being disposed so that said first section communicates with the annular air cavities of said head adapter couplings.

18. Apparatus as recited in claim 17 further including an air conduit disposed in said air conduit capture cavity.

19. Apparatus as recited in claim 18 wherein said air conduit has a slot shaped outlet opening.

20. Apparatus as recited in claim 17 wherein said coupling cavities, said electrode capture cavities, said first passages and said second passages are oriented so that the head adapter couplings are parallel in said junction block.

21. Apparatus as recited in claim 17 wherein said coupling cavities, said electrode capture cavities, said first passages converge in said junction block so that the wires intersect at a point in front of said block at the desired intersect angle.

22. Apparatus as recited in claim 17 further including for each said cable an electrode capture member for securing the electrode to the adapter section of said head adapter coupling within said electrode capture coupling.

23. Apparatus as recited in claim 22 wherein each said electrode capture member includes a two piece member having a cylindrical capture opening formed by a semicircular passage in each piece and means for adjusting the diameter of said capture opening by adjusting the separation of said pieces.

24. In an arc metal spray system, the improvement being a spray head and two head adapter couplings for connecting the spray head and a two cable system, each said head adapter coupling comprising;

(a) a coupling having a longitudinal channel for receiving a spray wire and a cylindrical power cable, the outer surface of said coupling having an annular cavity around the central portion thereof, said coupling having longitudinal passages communicating between said annular cavity and the outer end of said coupling for receiving high pressure air, said coupling having an adapter section at the inner end for mating with an electrode; and (b) a spray head including a junction block for mating said head adapter couplings with electrodes and an air conduit, said junction block including for mating with each said cable (1) a coupling cavity adapted to receive the central portion of the head adapter coupling;

(2) an electrode capture cavity;

(3) a first passage between said coupling cavity and said electrode capture cavity;

(4) a second passage between said electrode capture cavity and the front of said junction block for receiving the rear of the electrode;

(5) said coupling cavity, said first passage, said electrode capture cavity, and said second passage being disposed so that said head adapter coupling may be inserted into said junction block with the adapter section extending into said electrode capture cavity and said central section being disposed in said coupling cavity, the rear of said electrode being inserted through said second passage into said adapter section of said head adapter coupling;

(c) said junction block further including;

(1) an air conduit capture cavity disposed between said second passages, (2) an air passage having a first section communicating between said coupling cavities, and a second section communicating between said first section and said air conduit capture cavity, (3) said air passage being disposed so that said first section communicates with the annular air cavities of said head adapter couplings.

25. Apparatus as recited in claim 24 wherein said coupling cavities, said electrode capture cavities, said first passages and said second passages are oriented so that the head adapter couplings are parallel to said junction block.

26. Apparatus as recited in claim 24 wherein said coupling cavities, said electrode capture cavities, and said first passages converge in said junction block so that wires passing through said first passages intersect at a point in front of said block at the desired intersect angle.

27. Apparatus as recited in claim 24 further including for each said cable an electrode capture member for securing the electrode to the adapter section of said head adapter coupling within said electrode capture coupling.

28. Apparatus as recited in claim 27 wherein each electrode capture member includes a two piece member having a cylindrical capture opening formed by a semicircular passage in each piece and means for adjusting the diameter of said capture opening by adjusting the separation of said pieces.

29. Apparatus as recited in claim 24 further including an air conduit disposed in said air conduit capture cavity.

30. Apparatus as recited in claim 29 wherein said air conduit has a slot shaped outlet opening.

* * * * *